April 24, 1951
K. R. WENDT
2,550,178
DIRECT CURRENT REINSERTION CIRCUIT FOR TELEVISION SYSTEMS
Filed Nov. 21, 1946
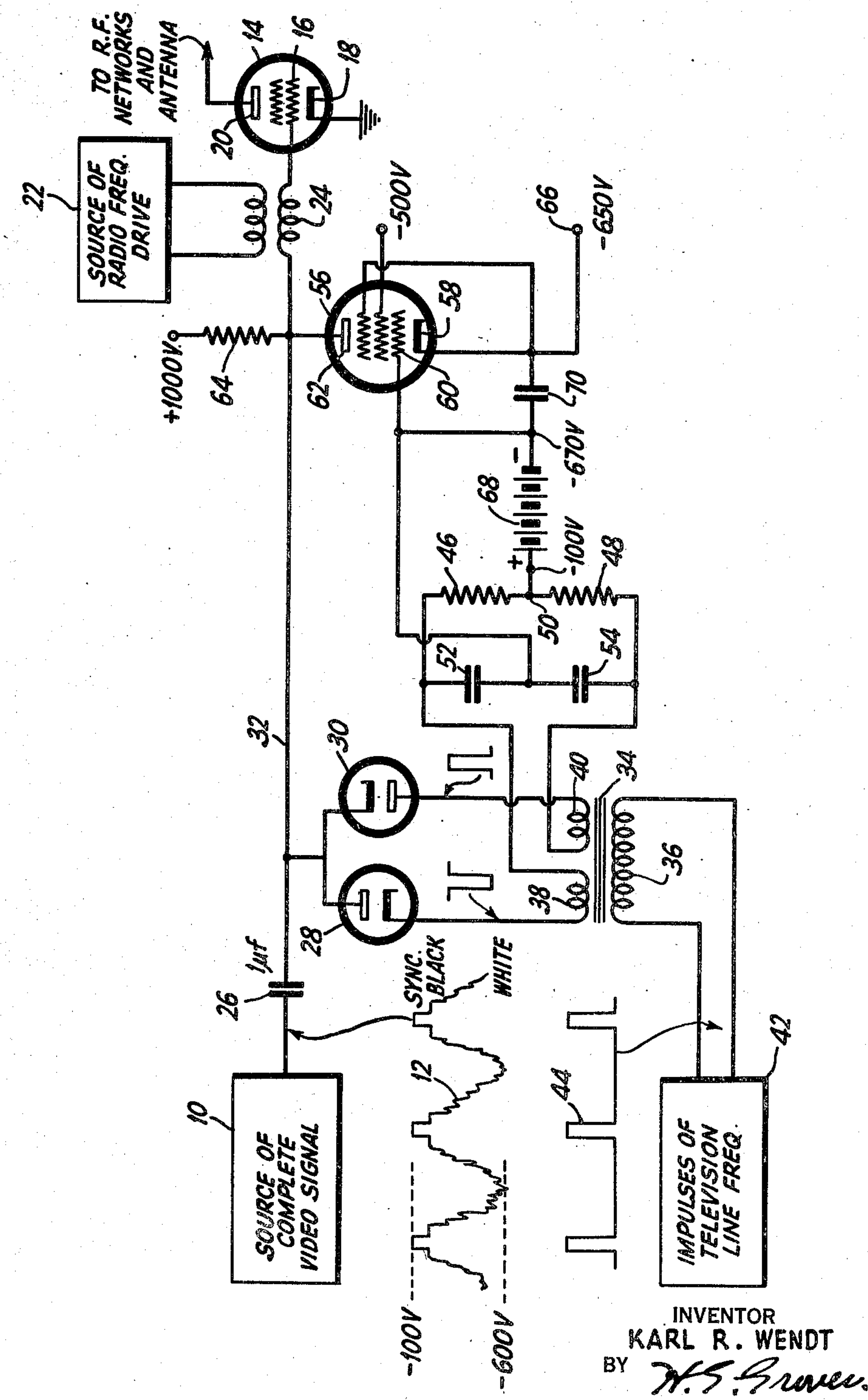
INVENTOR
KARL R. WENDT
BY W. S. Grover.
ATTORNEY Patented Apr. 24, 1951

2,550,178

UNITED STATES PATENT OFFICE 2,550,178

DIRECT CURRENT REINSERTION CIRCUIT FOR TELEVISION SYSTEMS

Karl R. Wendt, Hightstown, N. J., assignor to Radio Corporation of America, a corporation of Delaware Application November 21, 1946, Serial No. 711,435

8 Claims. (Cl. 178—7.1)

The present invention relates to television, and, more particularly, to the establishment of the direct current level in television systems and especially in systems wherein appreciable current is normally present in the control electrode circuit of the tube wherein the direct current level is established.

In the transmission of television signals, it is well known to those skilled in the art that it is not only necessary to transmit the alternating current components of the video signal but it is also desirable to transmit the so-called direct current component in order that a satisfactory automatic gain control action may be made possible in a remotely located receiver. Moreover, the insertion of the direct current component at the transmitter materially reduces the possibilities of distortion at the transmitter for a given power output and similarly reduces distortion possibilities for a given intermediate pass band in a television receiver.

Accordingly, in the actual radio frequency transmission of video signals, it is standard practice to transmit the synchronizing signals at full or maximum carrier intensity and to transmit a blanking or black level signal at approximately 75% of maximum carrier intensity. The synchronizing signal is superimposed upon the blanking or black level signal and a small portion of the blanking signal precedes, in point of time, the synchronizing signal with the remainder of the blanking signal following the synchronizing signal. During the intervals between successive blanking signals, the video signal or image intelligence is transmitted. Since the blanking signals and the synchronizing signals are always transmitted at substantially the same carrier intensity, either of these signals may be used as a reference point for determining the direct current level of the received signals. For example, in a receiver, since the blanking signal is always transmitted at the same carrier level (and also represents full black in the image), the signal intensity during these intervals may then be used as a criterion for setting the proper average potential of the control electrode of the receiving tube or kinescope.

In video amplifiers, both in the transmitter and in the receiver, no attempt is made to retain the direct current level throughout the entire amplifier. Such amplifiers are normally resistance-capacitance coupled and in passing the signal through the coupling condenser between stages, the direct current component is lost with the result that the average potential of the control electrode of the next succeeding electron discharge tube corresponds to the average signal strength or intensity of the video signals. In the case of a predominately black picture the average video signal intensity (or alternating current axis) may fall relatively close to the blanking signal level or in the case of a predominately white image, it may fall an appreciable distance from the blanking signal and may, in fact, be near signals representing white in the image. This variation of the average potential results in a wavering or constantly shifting of the potential of the control electrode as a function of image brightness as compared with signals representing a fixed intensity as, for example, black. Unless the direct current component is reinserted acceptable images cannot be reproduced.

In most video amplifiers and in television receivers, in general, the direct current level can readily be established by one or another of several methods, one of which is the well known use of a diode which acts as a peak detector for establishing a predetermined potential level on the control electrode of the next succeeding electron discharge tube (which may be an amplifier or, in fact, a kinescope) during each synchronizing interval. This potential is retained throughout a complete line interval and upon this potential is super-imposed the alternating current component. The retention of the potential is generally possible by reason of the fact that no grid current is ordinarily drawn and as a result, there is a relatively high impedance path over which the charge produced on the coupling condenser (or on any other condenser so provided for the purpose) may dissipate itself.

There are instances, however, especially in television transmitters, wherein the direct current level must be controlled at a tube (or tubes) in which the tube draws considerable grid current, with the result that the discharge path for any condenser that may be provided would have relatively low impedance which would result in a rather rapid discharge of the condenser. This rapid discharge of the condenser mitigates against a retention of the charge or appropriate potential level throughout a line interval. Retention of the charge can be enhanced by increasing the size of the condenser but there is a practical limit in the extent to which the condenser size may be increased. Furthermore, to re-establish the loss of charge from the condenser, especially if a large condenser is used, a considerable quantity of current may be required and this entire charging current must be supplied during the brief blanking or synchronizing interval. Accordingly, the currents necessary to recharge large condensers which operate into a low impedance load circuit become phenomenally large and impractical.

The present invention, therefore, relates to a new and improved method of establishing a direct current level in a television transmitter wherein the direct current insertion is made at a point where the next succeeding tube or tubes draws considerable grid current. A coupling condenser of conventional capacitance is provided and an electron discharge tube, the impedance of which is controlled in accordance with the direct current component, is included in the grid circuit of the tube where the direct current insertion is made. The electron discharge tube then will maintain the proper desired potential of the control electrode of the tube or tubes where the direct current level is maintained so that the direct current component can be properly applied to the video signal series.

One purpose of the present invention, therefore, resides in the provision of a new and improved circuit arrangement for establishing the direct current level in a television system.

Another purpose of the present invention resides in the provision of means, in a television system wherein an electron tube is present which draws grid current, for establishing the proper direct current level at the control electrode in spite of the fact that the tube draws grid current.

Another purpose of the present invention resides in re-establishment of the direct current level in a television system by providing an electron discharge tube in the circuit of the control electrode of the tube whereat the direct current insertion is desired and altering the impedance of the electron discharge tube in accordance with signal strength of the video signals during the blanking and/or synchronizing intervals.

Still another purpose of the present invention resides in the use of a keyed direct current level setter for inserting the direct current component in a television system in which the keyed circuit controls the impedance of an electron discharge tube which in turn alters the potential of the control electrode of the tube whereat the direct current insertion takes place.

Still another purpose of the present invention resides in the provision of means in a television transmitter for establishing the direct current level at a radio frequency power output tube by providing in the grid circuit of the power tube, an impedance in the form of an electron discharge tube in which the impedance of the tube is altered in accordance with the level of the video signals at predetermined intervals such as, for example, during blanking and/or synchronizing intervals.

Various other purposes and advantages of the present invention will become more apparent to those skilled in the art from the following description, particularly when considered in connection with the drawing, wherein:

The single figure represents schematically a preferred form of the present invention.

Referring now to the drawing, there is shown a source 10 of complete video signals which include the blanking and synchronizing signals or impulses. The waveform of the signals available from this source 10 is shown, by way of example, at 12 and the polarity of the signals is such that signals representing white in the image extend in a negative direction while the signals representing the synchronizing signals extend in a positive direction. Furthermore, the peak-to-peak variation of the signals as between the tops of the synchronizing impulses and signals representing full white in the picture may be of the order of 500 volts. These signals, available from the source 10, are used to control the potential of the control electrode 16 of a radio frequency power tube 14. The radio frequency power tube 14 includes, in addition, at least a cathode 18 and an anode 20. This radio frequency power tube may, for example, be the final tube in a television transmitter, in which case radio frequency energy from the anode 20 will be supplied to appropriate radio frequency networks (as, for example, vestigial suppression circuits) and ultimately to a transmitting antenna.

A source of radio frequency energy 22 is also provided and, by coupling through the radio frequency transformer 24, the source of radio frequency driving energy may be applied to the control electrode 16 of the output tube 14. The applied radio frequency energy from the source 22 is preferably of uniform amplitude and simultaneously with the application of the radio frequency energy to the control electrode 16, video signals from the source 10 are also supplied to this same control electrode by way of coupling condenser 26. Fluctuations at the potential of the control electrode by reason of the video signal applied thereto by way of condenser 26, causes corresponding variations in the amplitude of the radio frequency energy available at the anode 20, thus providing a modulated signal for application to the radiating antenna.

It is well known to those skilled in the art that radio frequency power amplifiers normally draw considerable grid current so that if a normal grid circuit were used for tube 14, a relatively low impedance discharge path would be provided for the coupling condenser 26. If the usual keyed D. C. insertion were employed or if the usual diode peak rectifier type inserters were used, then the charge produced on condenser 26 would be very rapidly dissipated through the low impedance of the grid circuit. If, on the other hand, the size of the condenser 26 were increased to a very large value in order that the time constant could be increased and in order that the potential change (from a D. C. standpoint) throughout one line would not be appreciable, considerable power and high current pulses would then be required to recharge such a large condenser during the brief synchronizing intervals and such current demands would become entirely impractical.

In the present arrangement, the condenser 26 is of more or less conventional size and in practice the use of a 1.0 mf. condenser is fully adequate. For establishing the desired direct current injection, a pair of diodes 28 and 30 are provided and the anode of diode 28 as well as the cathode of diode 30 are connected to the conductor 32 which extends between the coupling condenser 26 and the secondary of the radio frequency coupling transformer 24. This conductor 32 is galvanically connected to the control electrode 16 with no intervening blocking condensers.

Associated with the two diodes 28 and 30 is a transformer 34 having a primary 36 and two secondaries 38 and 40. The primary 36 is supplied with impulses of short duration and these impulses coincide both in frequency and phase relationship with the line synchronizing impulses of the video signals. It is preferable that the impulses be of a duration corresponding to, or slightly less than, the duration of the line synchronizing impulses. These impulses may be derived from any appropriate source 42 which may be a synchronizing signal generated or, in fact, the impulses may be derived from the video signals per se by appropriate clipper tubes and circuit arrangements. The source of the signals represented by the curve 44 is immaterial so far as the present invention is concerned and it is only necessary that these impulses be of line frequency and be in phase with the occurrence of the line synchronizing impulses of video signal series represented in the curve 12.

One end of the secondary winding 38 is connected to the cathode of diode 28 and the other end of the secondary 38 is connected to one end of a resistance 46. Similarly one end of the secondary 40 is connected to the anode of the diode 30 whereas the other end of the secondary 40 is connected to one end of a resistance 48. The two resistances 46 and 48 are connected in series at a junction point 50. A pair of condensers 52 and 54 are also connected in series with each other and in parallel with the resistances 46 and 48. The two secondary windings 38 and 40 are so poled as to produce a negative impulse at the cathode of diode 28 and simultaneously a positive impulse and at the anode of diode 30 upon the application of each impulse 44 to the primary winding 36. These impulses must be of sufficient magnitude to render both the diodes 28 and 30 conductive during the line or horizontal synchronizing intervals. When tubes 28 and 30 are rendered conductive, the potential of point 50 (i. e., the junction of resistances 46 and 48 is brought to the same potential that exists on conductor 32 at this particular instant. The resistances 46 and 48 are of identical magnitude.

Since the cathode 18 of the power output tube is shown as connected to ground potential, the anode 20 will be operated at a potential considerably positive with respect thereto. Furthermore, it will be assumed that for proper operation, the control electrodes 16 of the radio frequency power amplifier tube 14 as well as conductor 32 should be maintained at a direct current potential of approximately 100 volts negative with respect to ground, which is the assumed potential of the synchronizing impulses of the video signal wave as derived from the source 10 of video signals.

A further electron discharge tube 56 is provided having a cathode 58, a control electrode 60 and an anode 62. Both tubes 56 and 14 may include elements other than those named, in which case appropriate means will be provided for maintaining said other electrodes at their proper operating potentials. The anode 62 of tube 56 is connected directly to the conductor 32 and this conductor is also connected to a source of positive potential by way of resistance 64. The resistance 64 primarily constitutes a load impedance for discharge tube 56. Since the anode 62 of tube 56 is actually at a negative potential with respect to ground, the cathode 58 must be considerably more negative with respect to ground and, accordingly, the cathode 58 is connected to terminal 66 to which a source of negative potential is applied. Similarly, the control electrode 60 of tube 56 must be even more negative, for proper operation, than the cathode 58 and accordingly, a source of potential 68 is provided. This source of potential is connected between the control electrode 60 and the point 50 with the positive terminal connected to point 50 and the negative potential connected to the control electrode 60. It will be observed that potential values have been assigned to both the point 50 and the control electrode 60 and these potentials are, respectively, −100 volts and −670 volts. This maintains the control electrode 60 negative (neglecting control potential variations) with respect to the cathode 58 which is maintained at −650 volts.

As stated above, when the diodes 28 and 30 are rendered conductive due to the impulses applied to these tubes by way of transformer 34, point 50 will assume a potential that is identical to the potential of the conductor 32 during the conducting intervals of tubes 28 and 30. The conducting intervals coincide with the synchronizing signal intervals of the complete video signal series. The negative potential present on conductor 32 during these intervals is added to the potential of the source 68 and operates to maintain a predetermined negative potential on the control electrode 60 of tube 56 to determine the impedance of this tube. In order that this potential will be maintained substantially uniform or constant between successive line synchronizing intervals, a condenser 70 is provided which is connected between the control electrode 60 and the cathode 58 of tube 56. Since tube 56 does not draw any grid current and since there is no discharge path actually provided for the condenser 70, any charge that is placed on this condenser during any individual line synchronizing interval is, for all practical purposes, fully maintained until the next succeeding line synchronizing interval. According, the impedance of tube 56 is maintained constant between successive line synchronizing intervals. Accordingly, tube 56 will draw current through the load resistance 64 and also from the control electrode 16 of tube 14 by reason of secondary emission therefrom. This establishes a direct current potential on conductor 32 which is correct to maintain the proper direct current potential of the control electrode 16.

If, for example, the potential of conductor 32 should for some reason (such as a picture content change) become more positive (i. e., less negative), the potential of the control electrode of tube 56 would similarly become less negative by reason of the action of the keyed diodes 28 and 30. Tube 56 would, because of this reduced negative bias draw more current and cause the potential of conductor 32 to become more negative due to the increase in the potential drop across the load impedance 64, thus re-establishing the proper direct current level. Conversely, if for some reason the potential of conductor 32 should become too negative, then point 50 will correspondingly be more negative and the current drawn by tube 56 will be decreased. A decrease in the current drawn by tube 56 results in a change in the potential of conductor 32 in a positive direction to again re-establish the proper voltage level for the control electrode 16 in order that the desired radio frequency amplitudes will be transmitted. It is clear, therefore, that the direct current potential of the conductor 32 may be maintained at all times at the proper direct current level regardless of the image content and regardless of any shift of the A. C. axis of the video signal due to the image brightness. Furthermore, it is clear that the potential of conductor 32 is established during each line synchronizing interval and is maintained throughout the entire period intervening successive line synchronizing interval.

In order to increase the equilibrium of the system, feedback is provided by connecting the junction of the condensers 52 and 54 to the control electrode 60 of the tube 56.

In the drawing, various potential values are shown but it must be pointed out that these potential values depend upon the operating potentials of the radio frequency power output tube 14 and the other potential levels of the system. They should be considered merely as relative to each other and not as absolute or necessary values.

Furthermore, the invention is described as applied to a radio frequency power output tube, but the present invention is also applicable to other installations and can very advantageously be used for establishing the direct current level at any tube where an appreciable amount of grid current is drawn. The circuit arrangement, for example, could be used for establishing proper direct current level on the modulator tube which supplies the waveform 12 from the source 10 in Figure 1. In such a tube, the synchronized signals would extend in a negative direction and would be smaller in amplitude. Furthermore, less grid current would be drawn and a tube of lower current rating could be used in place of tube 56. Naturally, where the direct current level is controlled in the grid of the modulator, a direct current connection should be maintained between that tube and the radio frequency power tube, or, if such a connection is not provided, some provision must be made whereby the direct current established at the modulator is not again lost in subsequent circuit arrangements.

Having now described my invention, what is claimed is:

1. A television system wherein there is provided a source of television video signals including both image and synchronizing signals, a first electron discharge tube having at least an anode, cathode and control electrode, an input circuit having a terminal galvanically connected with said first tube control electrode, means for applying the video signal to said input circuit terminal, a second electron discharge tube having at least an anode, cathode and control electrode, a galvanic connection between said second discharge tube anode and said input circuit terminal, a galvanic connection from said second discharge tube cathode to a source of biasing potential for said first discharge tube control electrode, a circuit galvanically connected with said input terminal for developing a control potential whose magnitude represents the absolute potential of the peak excursions of said video signal synchronizing pulses at said input terminal relative to some constant datum potential, and connections impressing said control potential between the cathode and control electrode of said second discharge tube to control the impedance thereof whereby to alter the impedance of said second discharge tube in accordance with the absolute potential peaks of applied video signal.

2. A television system wherein there is provided a source of television video signals including both image and synchronizing signals, a first electron discharge tube having at least an anode, cathode and control electrode, an input circuit having a terminal galvanically connected with said first tube control electrode, means for applying the video signal to said input circuit terminal, a second electron discharge tube embracing a discharge path terminated by an anode and a cathode and controlled by a control electrode, a galvanic connection between one termination of said second tube discharge path and said input circuit terminal, a galvanic connection from the other discharge path termination of said second tube to a source of biasing potential for said first discharge tube control electrode, a circuit galvanically connected with said input terminal for developing a control potential whose magnitude represents the absolute potential of the peak excursions of said video signal synchronizing pulses at said input terminal relative to some constant datum potential, and connections impressing said control potential between the cathode and control electrode of said second discharge tube to control the impedance thereof whereby to alter the impedance of said second discharge tube in accordance with the absolute potential peaks of applied video signal.

3. Apparatus according to claim 2 wherein said first electron discharge tube is connected for operation as a grid modulated radio frequency amplifier, and wherein means for exciting said first discharge tube grid are connected serially between said input circuit terminal and said control electrode.

4. Apparatus according to claim 2 wherein said control potential developing circuit is of the electronic switch variety comprising in combination at least one diode one side of which is galvanically connected with said input circuit terminal, a capacitor connected between the other side of said diode and said second discharge tube cathode and means to key said diode into conduction during intervals corresponding to the video signal synchronizing signals and wherein said control potential impressing connections comprise a galvanic connection from the diode side of said capacitor to said second discharge tube control electrode.

5. A television system wherein there is provided a source of television video signals including both image and synchronizing signals, a first electron discharge tube having at least an anode, cathode and control electrode, an input circuit having a terminal galvanically connected with said first tube control electrode, means for applying the video signal to said input circuit terminal, a second electron discharge tube having at least an anode, cathode and control electrode, a galvanic connection between said second discharge tube anode and said input circuit terminal, a galvanic connection from said second discharge tube cathode to a source of biasing potential for said first discharge tube control electrode, a bleeder resistance connected from said first discharge tube control electrode to source of biasing potential of different value than said first mentioned biasing potential, a first and second diode each having an anode and a cathode, the anode of said first diode being connected with the cathode of said second diode, a galvanic connection from said first diode anode and said input circuit terminal, a first and second resistor connected to form a load combination, said load combination being in turn connected between the cathode of said first diode and the anode of said second diode, a first and second capacitor connected in series across said load combination, a galvanic connection from the junction of said first and second resistors to said second discharge tube control electrode, a galvanic connection from the junction of said first and second capacitors to said second discharge tube control electrode, and a source of keying signals serially interposed between said load combination and said diodes, said keying signals being synchronously related to said video signal synchronizing pulses and of such amplitude and polarity to render said diodes conducting during the occurrence of synchronizing signals.

6. Apparatus according to claim 5 wherein there is additionally provided a capacitor connected from the junction of said first and second resistors to the cathode of said second discharge tube.

7. An electrical circuit comprising in combination an input circuit terminal adapted to receive a voltage waveform having a recurrent pulse component representative of predetermined signal information, a first and second diode each having an anode and a cathode, the anode of said first diode being connected with the cathode of said second diode, a galvanic connection from said first diode anode and said input circuit terminal, a first and second resistor connected to form a load combination, said load combination being in turn connected between the cathode of said first diode and the anode of said second diode, a first and second capacitor connected in series across said load combination, an electron discharge tube having at least an anode, a cathode and control electrode, a galvanic connection from the junction of said first and second resistors to said discharge tube control electrode, a galvanic connection from the junction of said first and second capacitors to said discharge tube control electrode, a source of keying signals serially interposed between said load combination and said diodes, said keying signals being synchronously related to said voltage waveform pulse component, and a biased load circuit connected between the anode and cathode of said discharge tube, whereby the direction current potential of said discharge tube anode is a smooth representation of the envelope described by the peaks of said voltage waveform recurrent pulse component.

8. Apparatus according to claim 7 wherein there is additionally provided a capacitor connected from the junction of said first and second resistor to the cathode of said discharge tube.

KARL R. WENDT.

REFERENCES CITED

The following references are of record in the file of this patent:

UNITED STATES PATENTS

| Number | Name | Date |
|---|---|---|
| 2,208,927 | Hefele | July 23, 1940 |
| 2,244,240 | Blumlein | June 3, 1941 |
| 2,258,732 | Blumlein | Oct. 14, 1941 |
| 2,259,538 | Wheeler | Oct. 21, 1941 |
| 2,284,085 | Collard | May 26, 1942 |
| 2,299,945 | Wendt | Oct. 27, 1942 |
| 2,302,425 | Deerhake | Nov. 17, 1942 |
| 2,303,909 | Blumlein | Dec. 1, 1942 |
| 2,307,375 | Blumlein | June 5, 1943 |
| 2,358,545 | Wendt | Sept. 19, 1944 |

FOREIGN PATENTS

| Number | Country | Date |
|---|---|---|
| 858,486 | France | Nov. 26, 1940 |